United States Patent [19]
Yung

[11] Patent Number: 5,809,324
[45] Date of Patent: Sep. 15, 1998

[54] MULTIPLE INSTRUCTION DISPATCH SYSTEM FOR PIPELINED MICROPROCESSOR WITHOUT BRANCH BREAKS

[75] Inventor: Robert Yung, Fremont, Calif.

[73] Assignee: Sun Microsystems, Inc., Palo Alto, Calif.

[21] Appl. No.: 569,725

[22] Filed: Dec. 7, 1995

[51] Int. Cl.[6] .................................................. G06F 9/30

[52] U.S. Cl. ...................... 395/800.23; 395/394; 395/586

[58] Field of Search ............................. 355/800; 395/586, 395/582, 389, 391, 393, 394, 800.23

[56] References Cited

U.S. PATENT DOCUMENTS 5,542,109  7/1996  Blomgren et al. ................. 395/800.23
5,598,546  1/1997  Blomgren ............................... 395/385

Primary Examiner—Larry D. Donaghue
Attorney, Agent, or Firm—Townsend and Townsend and Crew LLP

[57] ABSTRACT

A microprocessor with a dispatch unit which dispatches a maximum number of instructions each cycle, without splitting into separate blocks after a branch instruction. A mispredicted branch is handled by setting a valid bit to invalid for instructions following the branch instruction in an outstanding instruction FIFO.

10 Claims, 5 Drawing Sheets

MULTIPLE INSTRUCTION DISPATCH SYSTEM FOR PIPELINED MICROPROCESSOR WITHOUT BRANCH BREAKS

BACKGROUND OF THE INVENTION

The present invention relates to RISC microprocessors which use multiple functional units which are pipelined, and in particular to the mechanisms used in the dispatch unit for dealing with branch instructions.

One of the key advantages of reduced instruction set computing (RISC) microprocessors is the ability to process instructions at a very high rate. Part of this is due to the clock speed, and part of it is due to the use of multiple function units in parallel, so that, in any one cycle, multiple functions are being performed on different instructions. In addition, pipelining is used so that each functional unit also moves its instructions through the pipeline each cycle. For example, a system with four function units used at a time and a nine-stage pipeline could have 9×4=36 instructions being processed at any one time. The instructions issued in the same cycle are referred to as an instruction group.

A major complication raised by such multiple function unit, pipelined architectures is dealing with branch or jump instructions. Since it will typically take a few pipeline cycles to calculate the target address of the branch and fetch the target instruction, this can cause delays and slow down the pipeline. One approach is to simply not issue additional instructions until the target address has been correctly calculated, or, if the branch is conditional, the condition has been determined as well. The pipeline will then simply be empty for several cycles while this is being resolved, taking away the performance advantage of the pipeline.

The typical method for dealing with branch instructions is to store one or more bits which predict the branch direction. Thus, the next instruction is fetched based upon this prediction, and the pipeline continues at full speed processing the predicted instruction and instructions following that predicted instruction. If the prediction is correct, the pipeline is not slowed down, providing maximum performance. If the prediction is incorrect, however, a mechanism must be used to flush the pipeline of the improperly predicted instructions. Typically, the prediction rate is high enough so that the time disadvantage of flushing the pipeline during rare mispredictions is outweighed by making maximum use of the pipeline during correct predictions.

Flushing the pipeline of the mispredicted instructions can be a complex task. In one approach, each instructions could be tagged to indicate that it follows a branch. The tags can then be subsequently examined. Unfortunately, this approach would require a great deal of extra hardware to examine the tags at each stage of each pipeline in each of the functional units. Waiting for the instructions to exit from the pipeline would not be sufficient, since it would require all the cycles needed to empty the pipeline before the flushing could commence, thus wasting additional time.

In an alternate method, used in the existing Sparc systems of Sun Microsystems, Inc., logic is used to keep track of the instructions following the branch by keeping track of which stage of the pipeline has the branch instruction as it propagates through the pipeline. One complication to this approach is that the branch could occur in the middle of multiple instructions in an instruction group in the pipeline. This is handled by holding up the issuance of additional instructions after the branch until the next cycle. Thus, if four instructions are issued to four functional units for each cycle, and instruction two is a branch, only two instructions will be issued, and the two instructions following the branch will wait until the following cycle. This approach has the advantage of simplifying the logic necessary to track where the mispredicted branch instructions are, but does not use the full capacity of the pipeline when the predicted target addresses of the branch are correct.

Accordingly, it would be desirable to have an improved mechanism for handling mispredicted branches in a multiple functional unit, multiple-stage pipeline microprocessor which requires minimal logic and maximizes the throughput for correctly-predicted branch target instructions.

SUMMARY OF THE INVENTION

The present invention provides a microprocessor with a dispatch unit which dispatches a maximum number of instructions each cycle, without splitting into separate blocks after a branch instruction. A mispredicted branch is handled by setting a valid bit to invalid for instructions following the branch instruction in an outstanding instruction FIFO.

In a preferred embodiment, the outstanding instruction FIFO is examined before an external memory access stage to avoid unnecessary memory access cycles for invalid instructions. The valid bit is also examined at the output of the pipeline. The matching of instructions in the functional units to those in the outstanding instruction FIFO is done by examining the OP code and determining which function unit corresponds to which position in the FIFO for a particular cycle or stage.

For a further understanding of the nature and advantages of the invention, reference should be made to the following description taken in conjunction with the accompanying drawings.

DESCRIPTION OF THE PREFERRED EMBODIMENT

Figure 1:
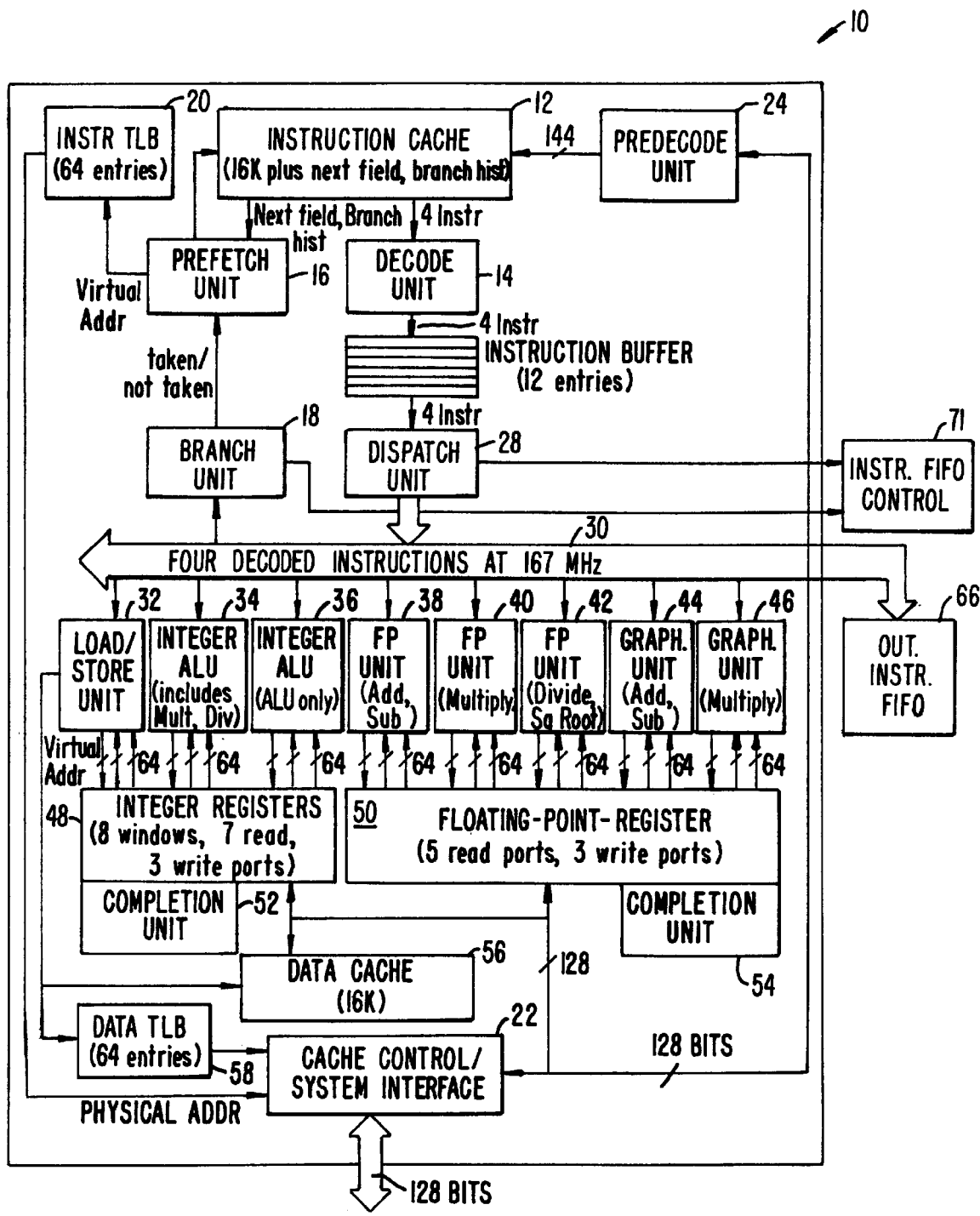
FIG. 1 is a block diagram of an embodiment of a microprocessor incorporating the present invention.

FIG. 1 is a block diagram of an UltraSparc™ microprocessor 10 incorporating the present invention. An instruction cache 12 provides instructions to a decode unit 14. The instruction cache can receive its instructions from a prefetch unit 16, which either receives instructions from branch unit 18 or provides a virtual address to an instruction TLB (translation look-aside buffer) 20, which then causes the instructions to be fetched from an off-chip cache through a cache control/system interface 22. The instructions from the off-chip cache are provided to a pre-decode unit 24 to provide certain information, such as whether it is a branch instruction, to instruction cache 12.

Instructions from decode unit 14 are provided to an instruction buffer 26, where they are accessed by dispatch unit 28. Dispatch unit 28 will provide four decoded instructions at a time along a bus 30, each instruction being provided to one of eight functional units 32–46. The dispatch unit will dispatch four such instructions each cycle, subject to checking for data dependencies and availability of the proper functional unit.

The first three functional units, the load/store unit 32 and the two integer ALU units 34 and 36, share a set of integer registers 48. Floating-point registers 50 are shared by floating point units 38, 40 and 42 and graphical units 44 and 46. Each of the integer and floating point functional unit groups have a corresponding completion unit, 52 and 54, respectively. The microprocessor also includes an on-chip data cache 56 and a data TLB 58.

An outstanding instruction FIFO 66 contains information on each instruction in the function unit pipeline. It is controlled by instruction FIFO control logic 71.

Figure 2:
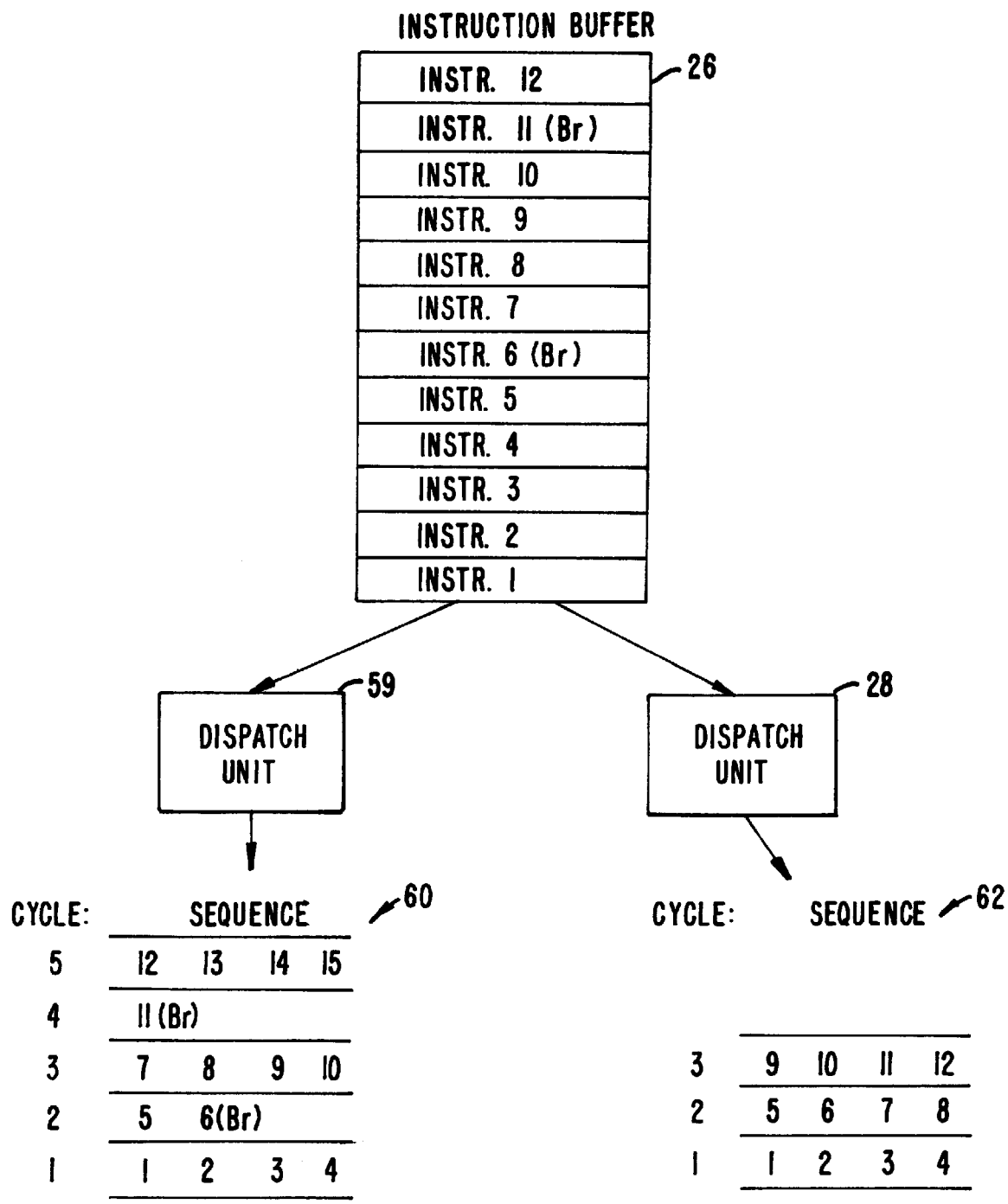
FIG. 2 is a diagram illustrating the assignment of instructions to functional units according to the prior art and the present invention.

FIG. 2 illustrates an example of the dispatching of instructions according to the present invention compared to the prior art. Instruction buffer 26 is illustrated with 12 instructions, including two branch instructions at instructions 6 and 11. Dispatch unit 28 provides these instructions to bus 30 connected to the multiple function units. On the left side of FIG. 2, the instructions dispatched in each of five cycles by a dispatcher 59 in a prior art sequence 60 are shown. The right side of FIG. 2 shows the dispatching by a dispatcher 28 of a sequence 62 according to the present invention which is able to dispatch the same instructions in three cycles, as shown.

The prior art dispatch unit 59 will provide instructions 1–4 in the first cycle. This is referred to as a basic block. In a second cycle, since instruction 6 is a branch instruction, only instructions 5 and 6 will be dispatched during cycle 2, thus providing a short basic block. Instruction 7 will not be dispatched until cycle 3. During cycle 3, instructions 7–10 are dispatched. In cycle 4, only instruction 11 is dispatched, since it again is a branch. Dispatching resumes with instruction 12 in cycle 5.

In this manner, the logic can track where in the pipeline instructions following a branch occur. For example, by noting that there was a branch in cycle 2, it is known that every stage following that, cycles 3–5 in this example, will have instructions along the branch predicted for instruction 6. The branch prediction logic will predict the branch direction (whether the branch is taken or not) and resolve the target address of the branch if it is predicted taken. If the direction or target address of this branch was mispredicted, the logic knows that all the instructions in cycles 3, 4 and 5, in the stages they are in at the appropriate time, need to be flushed. This could be done, for example, by setting all the valid bits corresponding to these instructions in an outstanding instruction FIFO to an invalid state. The disadvantage of this type of a system is that potential instruction slots in each cycle in the pipeline are wasted when the branch direction and target address are correctly predicted. In addition, as the scalarity of processors increases in the future (more instructions issued each cycle), the number of slots wasted under this type of system will increase. With more and more sophisticated branch prediction techniques being available today, there is a high probability that the branch target will be correctly predicted.

Dispatch unit 28 of the present invention, as shown in FIG. 2, provides instructions 1–4 in cycle 1, instructions 5–8 in cycle 2, and instructions 9–12 in cycle 3. In the example shown, the 12 instructions are dispatched in 3 cycles, as opposed to 5 cycles in the example of sequence 60. The 5 basic blocks of the prior art are combined into 3 superblocks. As can be seen, if there are a number of branches, this provides a significant throughput improvement.

Figure 3:
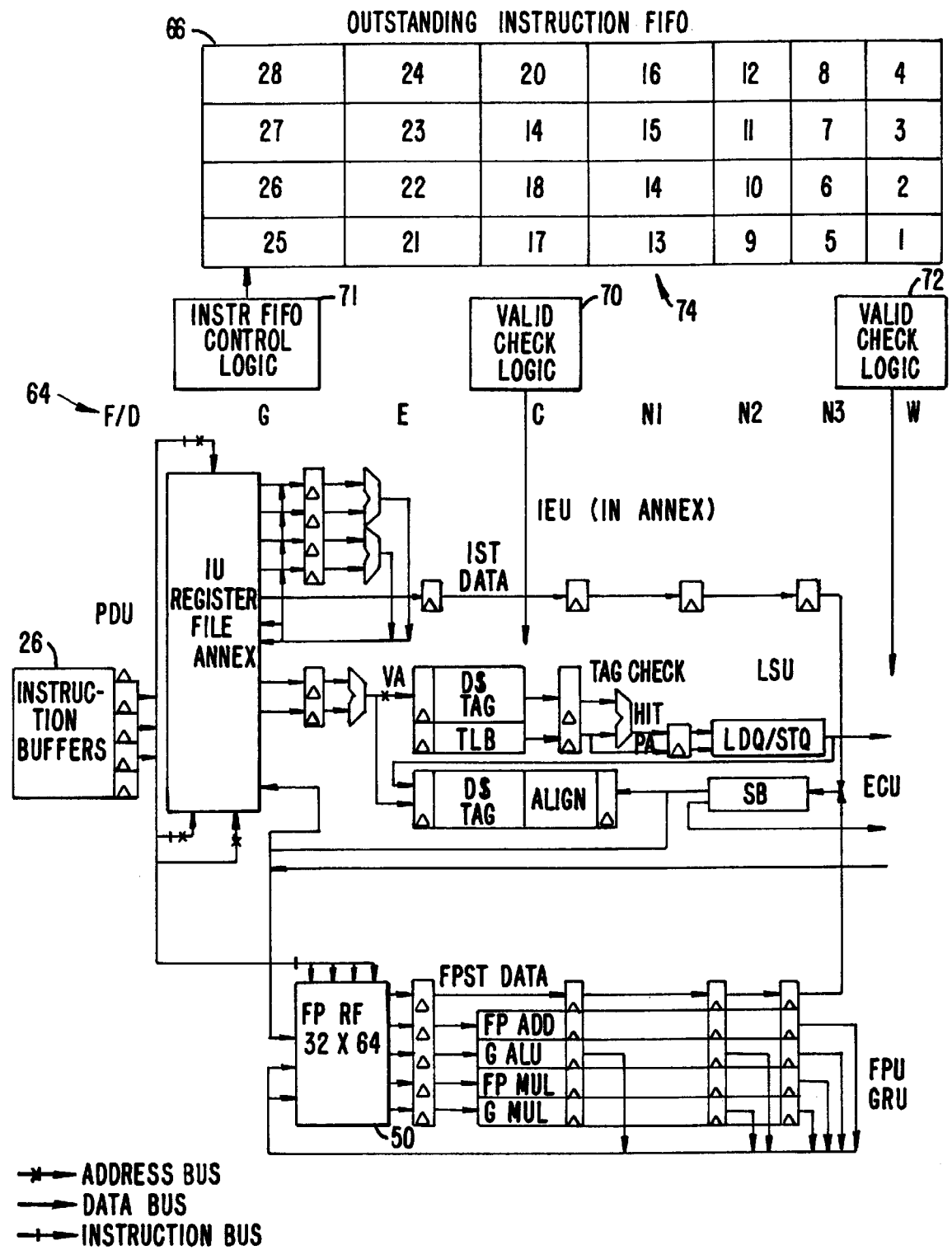
FIG. 3 is a diagram of the pipeline stages and outstanding instruction FIFO according to one embodiment of the present invention.

FIG. 3 illustrates in more detail the stages of some of the pipelines of FIG. 1. In particular, the floating point registers 50 are shown at the bottom, with the 5 floating point and graphical functional units being shown. The different stages of the pipeline are illustrated by the letters in line 64 in the middle of the diagram. At the top of FIG. 3, an outstanding instruction FIFO 66 is illustrated. As shown, the FIFO has 7 rows corresponding to 7 stages or cycles of the pipeline, with corresponding instructions being stored in 4 positions in each row, extending from 1 through 28 as shown. Each row thus stores an instruction group. The instructions corresponding to the positions in the FIFO will be found in the pipeline at the same cycle in the functional units. Instruction FIFO control logic 71 controls the operation of outstanding instruction FIFO 66.

The different stages shown are as follows. F/D stage is the stage where instructions are fetched from the cache. The D portion of this stage is for decoding of instructions and placing them in the instruction buffer 26. In stage G, up to 4 instructions, depending upon data dependency and functional unit requirements, are dispatched and the register files are accessed. Note that less than 4 instructions may be sent depending upon data dependencies, if the data needed by an instruction is not yet available. Alternately, if multiple instructions require the same functional unit, less than 4 instructions may be dispatched if an equivalent function unit is not available.

In stage E, execution occurs in the ALU, and the memory address is calculated. In stage C, the FPU calculation is started and the on-chip data cache and TLB are checked. Stage N1 is the second stage of the floating point calculation, and stage N2 is a floating point unit completion stage. Stage N3 allows a resolution of traps or errors and stage W is for the writing back of results to the register files.

Two sets of valid check logic are provided, a valid check logic 70 and valid check logic 72. Valid check logic 70 determines whether the instructions in the fourth stage of the pipeline, indicated as 74 in outstanding instruction FIFO 66, are valid. At this point, if the instructions are invalidated, the accessing of off-chip memory and its associated requirement of many cycles is avoided.

Valid check logic 72 determines at the output of the pipeline whether the instructions are valid to prevent invalid results being written into the register files. The valid check logic 70 and 72 are already in place for other purposes, and are simply used by the present invention. The present invention recognizes that by doing validity checks at this point, mispredicted branches can be "flushed" if the dispatch unit is modified to not break them into blocks, but to invalidate the appropriate bits in an outstanding instruction FIFO 66 upon the determination of a misprediction. The modification of an existing dispatch unit to do these functions is simple.

Whether a branch has been correctly predicted is determined by the branch resolution logic, which is commonly implemented in the branch unit. This logic provides the actual input signal to change the valid bits in outstanding instruction FIFO 66. This type of logic has been used before to invalidate instruction groups following a group having a branch.

Figure 4:
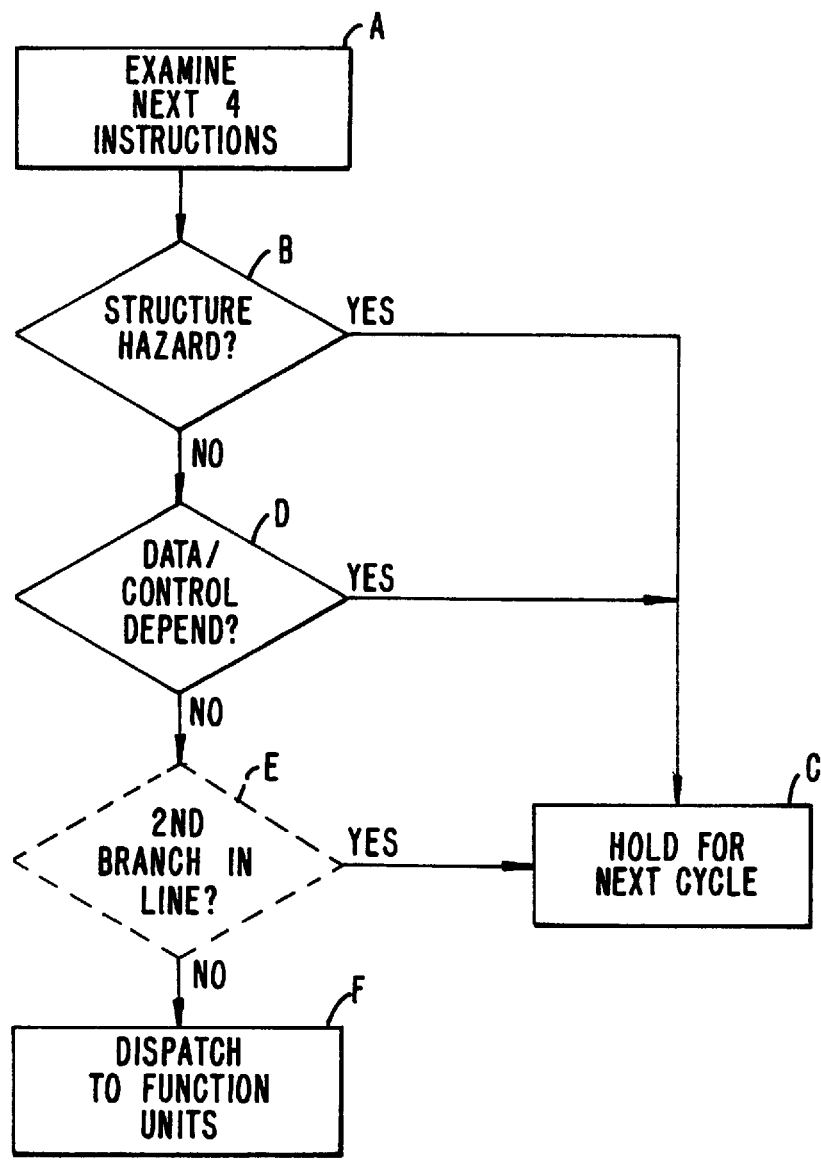
FIG. 4 is a flow chart of the operation of the dispatch unit according to one embodiment of the present invention.

FIG. 4 is a flow chart illustrating the steps taken by a dispatch unit according to the present invention. In step A, the next four instructions from instruction buffer 26 are examined. Structural hazards are then checked for (step B). This includes such things as the availability of the correct type of functional unit and any memory port or other resources needed by the instruction. If there are structural hazards, the instruction is held (step C). Data and control dependencies are checked (step D), and if there are dependencies that haven't been resolved, that instruction is held until the next cycle (step C). In one option, a check is performed to see if an instruction is the second branch in the same block of four instructions (step E). If it is, it is held until the next cycle. This prevents the need to duplicate the branch determination logic to determine two separate branches in the same cycle (or same few cycles, for future faster cycle machines). If the duplicate logic is provided, step E is eliminated. Finally, the instructions are dispatched to the function units (step F).

As noted, one option is to allow only a single branch instruction per group of instructions issued. The number of branches allowed in an issued group of instructions can be varied depending on the instruction scalarity. For example, suppose a 4 scalar machine is used, and it is statistically rare, for the applications supported, to have a branch more often than every 5 instructions. In this case, it will be rare that limiting each instruction group to one branch will have many unused slots, since rarely will there be 2 branches per 4 instructions. On the other hand, if a future machine is 10 scalar, with 10 instructions issuing at a time, it may be common to have 2 branches per instruction group, resulting in many wasted slots if only 1 branch is allowed per instruction group. It may thus be desirable, for such an example, to allow 2 (but perhaps not 3) branches per instruction group.

Figure 5:
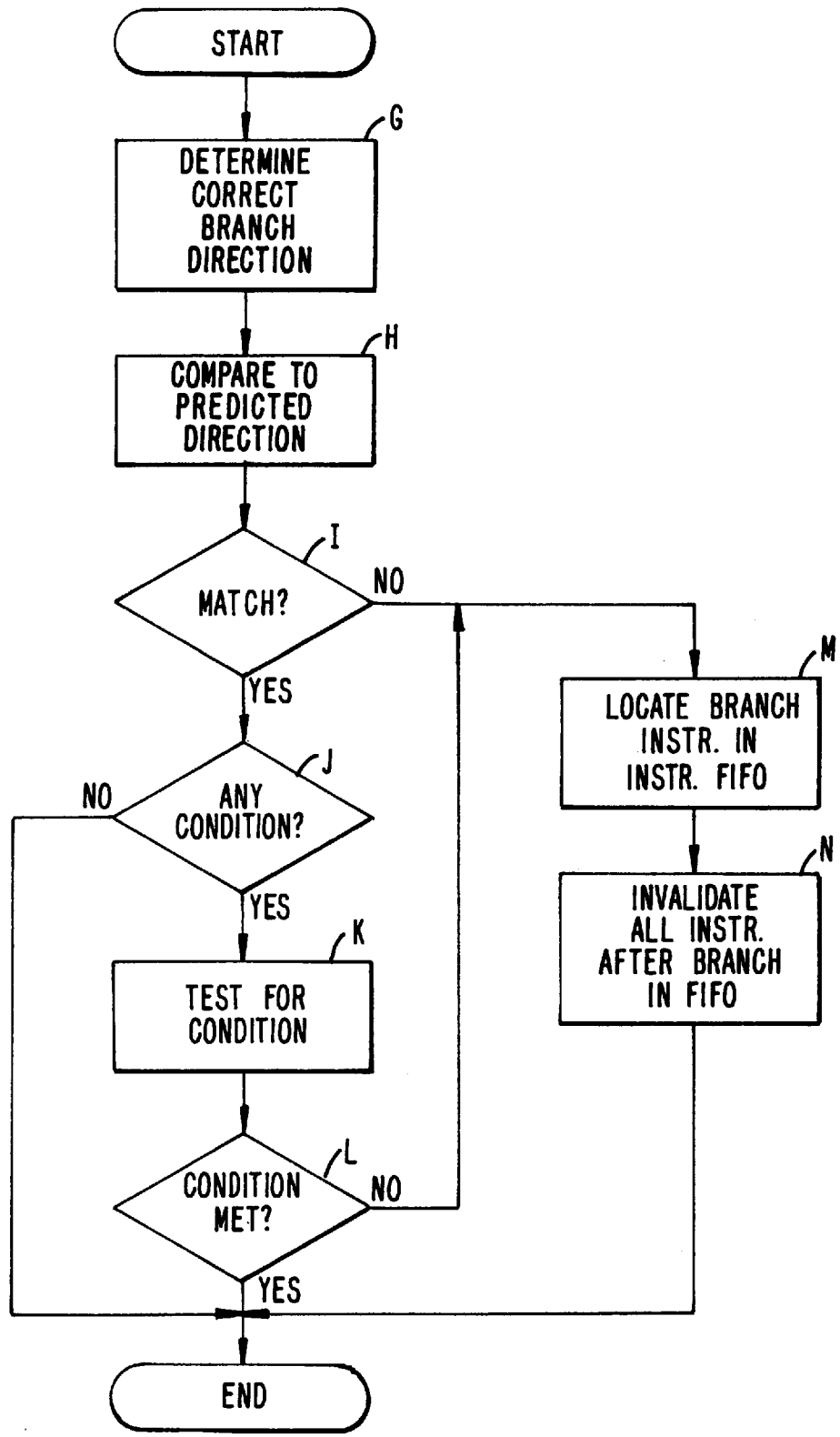
FIG. 5 is a flow chart of the operation of the branch unit and the outstanding instruction FIFO control logic in one embodiment of the present invention.

FIG. 5 is a flow chart of the steps taken by a branch unit according to the present invention. For a branch instruction, the correct branch direction is calculated (step G). The calculated branch direction is then compared to the predicted branch direction, and the target address is resolved (step H). If there is a match (step I), it is determined whether the branch is conditional (step J). If the branch is conditional, the condition is tested for (step K). If the condition is met (step L), the process is completed. If the branch is correctly predicted (both direction and target address), and any condition was met, there is no need to modify the dispatched instructions. If the branch is incorrectly predicted, or if any condition for a conditional branch is not met, the branch instruction is located in the instruction FIFO (step M). The valid bit is then set to an invalid state for all the instructions following the branch instruction (step N). This may be accomplished by branch unit 18 of FIG. 1 sending a control signal to instruction FIFO control logic 71 that the branch was mispredicted, identifying the branch instruction. Control logic 71 will then locate the instruction information in outstanding instruction FIFO 66 and set the appropriate valid bits to an invalid state.

In one embodiment, the valid check logic 70 or 72 can match the instruction in the appropriate function unit with the appropriate instruction data in an outstanding instruction FIFO 66. Outstanding instruction FIFO 66 will always have the instructions in the program order, as shown by the numbers in FIG. 3. However, the order can be different in the function units since these may vary depending upon the type of instruction. The valid check logic can match the data in outstanding instruction FIFO 66 to the functional unit by examining the OP code (or encoded OP code), and knowing which function unit that corresponds to. Where multiple functional units which can perform the same type of OP code are active, the valid check logic has the same priority assignment logic as the dispatch unit. For instance, the first add instruction could always be sent to the first integer ALU for an integer add. In an alternate embodiment, a functional unit ID is put in the instruction FIFO when the instruction is issued.

In one embodiment, the dispatch unit only allows a single branch instruction in each cycle. Thus, if there were branches in instructions 2 and 3 in a particular cycle, instruction 4 would wait until the next cycle, with only three instructions being sent in the first cycle. This restriction is used to allow the usage of only a single set of resolution hardware logic to determine the appropriate branch instruction. If there were a possibility of multiple branches within a single cycle, this logic would need to be duplicated, thus requiring more area on the microprocessor chip, so that the correct prediction of multiple branch instructions could be determined in a single cycle, or other short period of time (multiple cycles might be required for a very short cycle machine).

In an alternate embodiment, the branch resolution hardware could be duplicated to allow multiple branches per cycle, and thus allowing multiple branches to be dispatched in each cycle. Other embodiments could also have varying numbers of function units, varying numbers of pipeline stages, and varying numbers of branches allowed per cycle.

In another alternate embodiment, a single valid bit could be used for each stage or cycle in outstanding instruction FIFO register 66. For a mispredicted branch target, the entire line of the outstanding instruction FIFO corresponding to that stage or cycle could be invalidated. A flush would then be done of not only the target instructions, but the branch instruction itself and any earlier instructions in the same line corresponding to that stage or cycle. The branch instruction and any earlier instructions in the same line would then need to be dispatched again. This would be a different trade-off of hardware and logic complexity versus throughput.

The advantage of the present invention is that the dispatch unit can be simplified by not having to check for branches, and the throughput can be improved. The dispatch unit does not have to look for, or identify, branches at all when dispatching them to the function units if multiple branches are allowed per cycle. If only a single branch is allowed, the dispatch unit will have to check for at least the first branch.

As will be understood by those of skill in the art, the present invention could be embodied in other specific forms without departing from the spirit or essential characteristics thereof. For example, instead of the valid logic units determining the match between the functional unit instruction and the instruction data in the outstanding instruction FIFO, a tag could be carried along in the function unit instructions identifying a particular corresponding position in the outstanding instruction FIFO. Alternately, rather than a FIFO, other data storage structures could be used for storing the instruction validity data. Additional logic for checking the validity bits could be added to different areas of the pipeline. For instance, any time a long latency operation is about to commence (i.e., a floating point divide), the validity bit could be checked and the operation aborted if the instruction is now invalid. Accordingly, the foregoing description is intended to be illustrative of the preferred embodiments, and reference should be made to the appended claims for setting forth the scope of the invention.

What is claimed is:

1. A microprocessor comprising:

a plurality of pipelined functional units;

at least one instruction buffer providing a plurality of instructions, including branch instructions and predicted target instructions;

an instruction dispatch unit, coupled between said instruction buffer and said plurality of pipelined functional units, configured to dispatch both a branch instruction and a predicted target instruction to said functional units in a single cycle;

an outstanding instruction FIFO storing tracking data for each instruction in said plurality of pipelined functional units, said tracking data including a single valid bit for each instruction;

branch prediction logic configured to determine if said predicted target instruction was correctly predicted;

FIFO control logic configured to set said valid bit to an invalid state for said tracking data corresponding to said target instruction and subsequent instructions in said outstanding instruction FIFO if said predicted target instruction was mispredicted; and end of pipeline valid logic configured to check said valid bit for each instruction at the end of said pipelined functional units, and prevent the storing results of operations for any instruction determined to be invalid.

2. The microprocessor of claim 1 further comprising:

intermediate valid logic configured to check said valid bit for each instruction at an intermediate stage of said pipelined units before a long latency operation by said functional units, and to prevent the long latency operation for an instruction determined to be invalid.

3. The microprocessor of claim 2 wherein said long latency operation is an off-chip memory access.

4. The microprocessor of claim 2 wherein said instruction dispatch unit is further configured to allow only a predetermined number of branch instructions to be dispatched to said functional units in any given cycle.

5. The microprocessor of claim 4 wherein said predetermined number is one.

6. A method for operating a microprocessor having a plurality of pipelined function units, at least one instruction buffer, and an instruction dispatch unit, the method comprising the steps of:

providing a plurality of instructions to said instruction buffer, including branch instructions and predicted target instructions;

dispatching with said dispatch unit both a branch instruction and a predicted target instruction to said functional units in a single cycle;

storing tracking data, for each instruction in said plurality of pipelined function units, in an outstanding instruction FIFO, said tracking data including a single valid bit for each instruction;

determining if said predicted target instruction was correctly predicted;

setting said valid bit to an invalid state for said tracking data corresponding to said target instruction and subsequent instructions in said outstanding instruction FIFO if said predicted target instruction was mispredicted;

checking said valid bit for each instruction at the end of said pipelined functional units in end of pipeline valid logic; and preventing the storing of results of operations for any instruction determined to be invalid.

7. The method of claim 6 further comprising the steps of:

checking said valid bit for each instruction, at an intermediate stage of said pipelined units before a long latency operation by said functional units, in an intermediate valid logic; and preventing the long latency operation for an instruction determined to be valid.

8. The method of claim 6 further comprising the step of:

allowing only a predetermined number of branch instructions to be dispatched to said functional units by said instruction dispatch unit in any given cycle.

9. The method of claim 8 wherein said predetermined number is one.

10. A computer system comprising:

a memory; and a microprocessor coupled to said memory, said microprocessor including a plurality of pipelined functional units;

at least one instruction buffer providing a plurality of instructions, including branch instructions and predicted target instructions; and an instruction dispatch unit, coupled between said instruction buffer and said plurality of pipelined functional units, configured to dispatch both a branch instruction and a predicted target instruction to said functional units in a single cycle;

an outstanding instruction FIFO storing tracking data for each instruction in said plurality of pipelined functional units, said tracking data including a single valid bit for each instruction;

branch prediction logic configured to determine if said predicted target instruction was correctly predicted;

FIFO control logic configured to set said valid bit to an invalid state for said tracking data corresponding to said target instruction and subsequent instructions in said outstanding instruction FIFO if said predicted target instruction was mispredicted; and end of pipeline valid logic configured to check said valid bit for each instruction at the end of said pipelined functional units, and prevent the storing results of operations for any instruction determined to be invalid.

* * * * *